Jan. 26, 1932.  D. GREGG  1,842,829

ROTARY COMPRESSOR

Filed July 31, 1929

Inventor
David Gregg

Patented Jan. 26, 1932

1,842,829

UNITED STATES PATENT OFFICE

DAVID GREGG, OF ANDERSON, INDIANA

ROTARY COMPRESSOR

Application filed July 31, 1929. Serial No. 382,550.

This invention relates to improvements in fluid circulating devices, and particularly to such devices adapted for use as super-chargers in the fuel supply apparatus of internal combustion engines.

It is among the objects of the present invention to provide a fluid circulating device of simple structure and design, which may easily be assembled, and commercially produced at a minimum cost.

A further object of the invention is to provide a fluid circulating device with fluid displacement members in the form of vanes which are positively operated throughout their entire cycle of operation.

Further objects and advantages of the present invention will be apparent from the following description, reference being had to the accompanying drawings, wherein a preferred embodiment of one form of the present invention is clearly shown.

Figure 1:
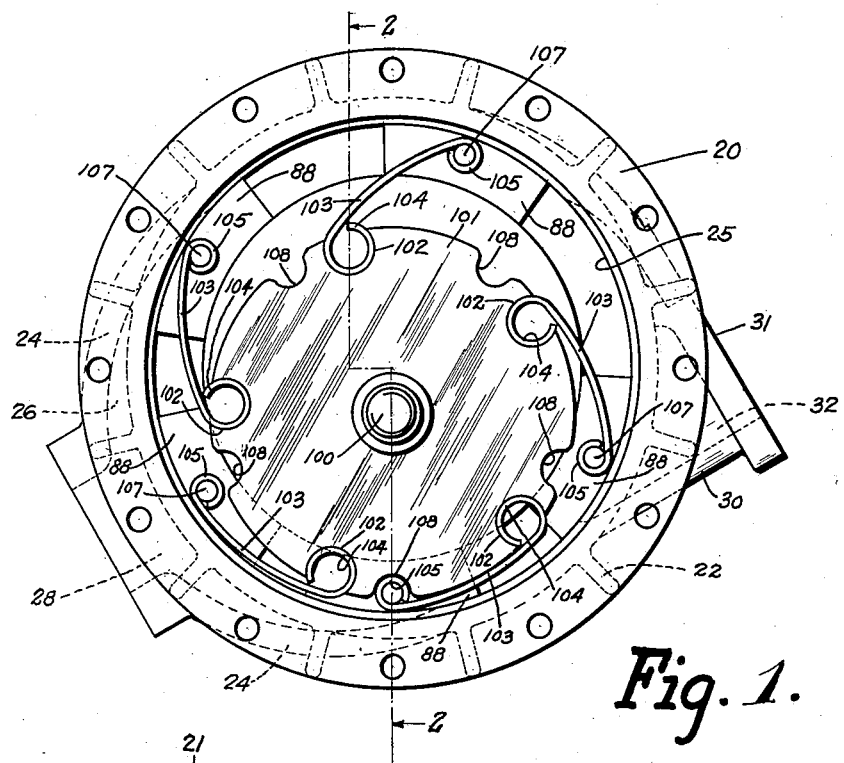
Fig. 1 is an end view of the fluid circulating device with one end cover removed to show interior structures.

Referring to the drawings, the super-charger is shown comprising a cylindrical housing 20 having an outwardly extending, annular flange 21 at each end thereof. For reinforcement purposes, housing 20 has a plurality of transverse ribs 22 extending from one flange to the other.

Fluid inlet and outlet ports 32 and 28 respectively are provided in the cylindrical wall of the housing. The inlet port 32 comprises wall portions 30 and 31 extending substantially tangentially from the cylindrical wall of the housing, the wall portion 31 providing a mounting flange for the intake pipe, not shown. The outlet port 28 comprises curved wall portions 24 extending from the cylindrical wall of the housing so as to form a chamber 26 inside the housing. Wall portions 24 terminate in a lug which provides a mounting means for the outlet pipe, not shown.

End cover members 35 and 36 are provided for the open ends of the housing, being secured to the annular flanges 21 by screws 38. To substantially eliminate fluid leaks between the housing and its end cover members, each of said members is provided with an annular extension 37, the outer peripheral edge of which fits snugly into a recess 23 provided in the housing.

Figure 2:
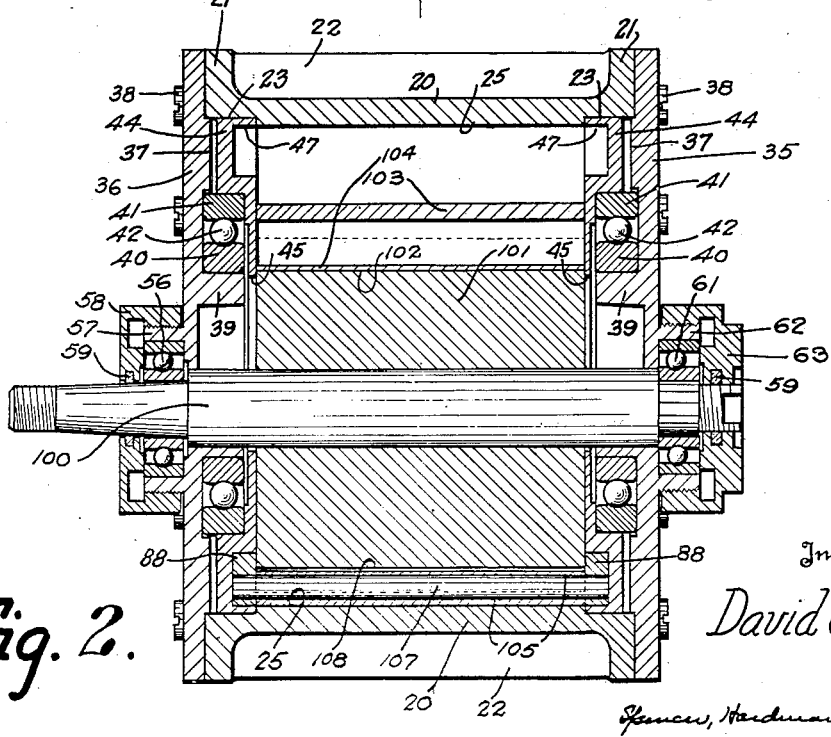
Fig. 2 is a cross sectional view taken along the line 2—2 of Fig. 1.

As shown in the Fig. 2, each end cover has an annular flange 39 provided on its inner surface, the outer peripheral surface of which is machined so as to be substantially concentric to the inner cylindrical surface 25 of the housing. Each flange 39 provides a support for a ball bearing which comprises outer and inner ball races 41 and 40 respectively and balls 42, the inner ball race fitting snugly upon the flange 39.

Each ball bearing of an end cover member supports a rotatable ring-disc 44, which has a recess adapted to fit snugly about the outer race member 41 of the respective ball bearing. Each ring disc has a central opening 45 which is substantially coaxial of the annular extension 39 of the end cover when the ring disc is placed upon the ball bearing of its respective end cover. In the surface of the ring disc 44 opposite to that having the recess which receives the race member 41, there is provided an annular recess 47 substantially coaxial of the inner cylindrical wall 25 of the housing when the ring disc is in position in said housing. Said recess 47 provides a track for purposes to be described. The two ring discs have their outer peripheral edges slidably engaging the peripheral surface of the annular recess 23 of the housing 20, whereby the ring discs 44 may be rotated relative to the housing 20 when the end cover members 35 and 36 are secured in position upon the housing by the screws 38.

The end cover members 35 and 36 of the device are each provided with an annular extension numbered 62 and 57 respectively, said extensions forming receptacles for the respective bearings 61 and 56. These bearings support the main shaft 100 eccentrically of the annular surface 25 of the housing 20, the shaft in turn carrying the rotor element 101. The annular extensions 62 and 57 are each provided with cover caps 63 and 58 respectively, each provided with a packing 59 to prevent fluid or lubricant from leaking past the shaft ends supported on their respective bearings. The one end of the shaft 100 extends beyond the housing 58 and has provisions for the attachment of a driving pulley or the like. The shaft 100 supporting the rotor 101 is made of any suitable material, the ends of the rotor operatively engaging the inner surfaces of the respective ring discs 44. As shown in Fig. 1 the rotor 101 has a plurality of longitudinal, cylindrically shaped grooves 102 formed in the outer peripheral surface and equally spaced.

The fluid displacement members designated by the numeral 103 are preferably made up of sheet metal, said displacement members being substantially as long as the rotor 101 so that their respective ends engage with the inner surfaces of the respective ring discs 44. Each fluid displacement member 103 has a tubular formation at both of its longitudinal edges, the tubular formation at the inner edge of the displacement member being designated by the numeral 104, the tubular formation at the outer edge of the said member being designated by the numeral 105. The outer transverse dimension of the tubular formation 104 is slightly less than the transverse dimension of the cylindrically shaped groove 102 so that the portion 104 of the fluid displacement member may be inserted longitudinally into the groove 102 whereby this tubular formation 104 hingedly secures said member to the rotor 101. The constricted opening of the groove 102 prevents removal of the fluid displacement member radially of the rotor 101.

Each end cover 35 and 36 carries a ring disc 44 which, as has been described, is provided with an annular recess 47, providing a track in which the shoes 88 are slidably supported. These shoes are moved in the track or recess 47 which is substantially concentric of the inner surface 25 of the casing.

A pin 107 is provided in the tubular formation 105, said pin extending from each end of said member. The extending portions of the pin are received by openings in the respective shoes 88, whereby the outer edge of each fluid displacement member is supported by a pin 107 suspended between shoes 88 in the respective ring discs of the end covers. The openings in the shoes 88 are so positioned that the outer peripheral edge of the tubular formation 105 is maintained in constant engagement with the inner surface 25 of the casing. Indents 108 are provided longitudinal of the rotor for receiving the tubular formations 105 of the respective fluid displacement members as they are moved through a certain portion of their cycle of operation. In Fig. 1 relative positions of the fluid displacement members to the casing and rotor may be seen. In this figure the topmost fluid displacement member 103 is substantially in its extreme intake position, that is, in a position in which the chamber between adjacent fluid displacement members is substantially at its greatest capacity. The two fluid displacement members at the lower side of the casing as shown in Fig. 1 are substantially in their extreme compressing positions, or more specifically, in the positions in which no substantial chamber exists. One of these lower fluid displacement members has its tubular formation 105 fully positioned within the indent 108, and its inner surface substantially engages the outer peripheral surface of the rotor.

From the aforegoing it may be seen that, as the rotor 101 rotates counterclockwise as regards Fig. 3, the space or chamber formed within the confines of the rotor 101, housing 20 and displacement member 103 at the top of the device shown in Fig. 3, is in communication with the intake port 32 and, due to the counter-clockwise rotation of the rotor, the fluid will flow from the intake port 32 into this chamber. As the rotor continues to turn, the displacement member 103 shown adjacent the intake port 32 in Fig. 1 will shut off communication between the aforementioned space and the intake port and thus pressure will be exerted upon the fluid within this space. When this space approaches the wall 24 of the housing which diverges from the annular wall thereof, the fluid within the aforementioned space will be permitted to exhaust through the port 28, which is the outlet port, fluid at this point being under compression. When the displacement member reaches the bottom of the compressor as regards Fig. 3, it will be noted that the space mentioned above will be practically nil, fluid therein having been compressed and forced from the outlet port 28.

The present invention provides a device comprising comparatively few parts. It provides a device in which the fluid displacement vanes are positively operated throughout their entire range of movement, not being dependent upon springs of any kind, said vanes operating directly through the operation of the rotor eccentrically to the housing, one edge of the vane being secured to the eccentrically operating rotor, the other edge of the vane being slidably secured to the housing.

While the form of embodiment of the present invention as herein disclosed, constitutes a preferred form, it is to be understood that other forms might be adopted, all coming within the scope of the claims which follow.

What is claimed is as follows:

1. In a fluid circulating device, the combination with a cylindrically shaped casing; of a rotor journalled eccentrically therein and having a longitudinal, cylindrical groove in its outer surface; a fluid displacement member having a tubular formation at the two longitudinal edges, one of said tubular formations fitting into the groove in the rotor, hingedly securing the member to the rotor; and means engaging the other tubular edge of said member positively to maintain said tubular edge in constant engagement with the inner surface of the casing.

2. In a fluid circulating device, the combination with a cylindrical casing provided with end covers; of a rotor in said casing journalled in said end covers eccentrically of the casing, said rotor having a longitudinal, cylindrical groove in its outer peripheral surface; a fluid displacement member having a tubular formation at each longitudinal edge, one of said tubular formations being insertable longitudinally into the groove of the rotor hingedly securing the member to said rotor; pins extending from each end of the other tubular formation; and means provided by the end covers for engaging said pins and constantly maintaining said tubular formation in engagement with the inner surface of the casing.

3. In a fluid circulating device, the combination with a cylindrical casing provided with end covers; of a rotor supported by said end covers eccentrically within said casing, said rotor having a longitudinal, cylindrical groove in its outer, peripheral surface; a sheet metal fluid displacement member having a tubular formation at each longitudinal edge, one of said formations fitting snugly into the groove of the rotor hingedly to secure the member to the rotor; a pin in the tubular formation at the outer edge of the member said pin extending from each end of said member; and a shoe slidably supported in each end cover so as to be movable in a path concentric with the inner surface of the casing each shoe receiving a respective end of the pin for maintaining the tubular formation of the displacement member about said pin in constant engagement with the inner surface of the casing while moving the member hingedly relative to the rotor.

4. In a fluid circulating device, the combination with a cylindrical casing provided with end covers; of a rotor supported by said end covers eccentrically within said casing, said rotor having a longitudinal, cylindrical groove in its outer, peripheral surface; a sheet metal fluid displacement member having a tubular formation at each longitudinal edge, one of said formations fitting snugly into the groove of the rotor hingedly to secure the member to the rotor; a pin in the tubular formation at the outer edge of the member, said pin extending from each end of said member; and a shoe slidably supported in each end cover so as to be movable in a path concentric with the inner surface of the casing each shoe receiving a respective end of the pin for maintaining the tubular formation of the displacement member about said pin in constant engagement with the inner surface of the casing while moving the member hingedly relatively to the rotor; and a longitudinal indent in the rotor for receiving the tubular formation at the outer edge of the displacement member during a certain portion of the cycle of operation of said member.

In testimony whereof I hereto affix my signature.

DAVID GREGG.